(12) United States Patent
Li et al.

(10) Patent No.: US 11,003,359 B2
(45) Date of Patent: May 11, 2021

(54) METHOD AND DEVICE FOR MANAGING DISK POOL

(71) Applicant: EMC IP Holding Company LLC, Hopkinton, MA (US)

(72) Inventors: Wayne Weihua Li, Beijing (CN); Jian Gao, Beijing (CN); Hongpo Gao, Beijing (CN); Jamin Kang, Beijing (CN); Xinlei Xu, Beijing (CN); Tao Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 15/954,929

(22) Filed: Apr. 17, 2018

(65) Prior Publication Data
US 2018/0300066 A1 Oct. 18, 2018

(30) Foreign Application Priority Data

Apr. 17, 2017 (CN) .......................... 201710250027.X

(51) Int. Cl.
*G06F 3/06* (2006.01)
(52) U.S. Cl.
CPC ............ *G06F 3/0611* (2013.01); *G06F 3/061* (2013.01); *G06F 3/0644* (2013.01); *G06F 3/0647* (2013.01); *G06F 3/0653* (2013.01); *G06F 3/0689* (2013.01)
(58) Field of Classification Search
CPC ...... G06F 3/0611; G06F 3/061; G06F 3/0644; G06F 3/0647; G06F 3/0653; G06F 3/0689
See application file for complete search history.

(56) References Cited

U.S. PATENT DOCUMENTS

| 6,530,035 | B1* | 3/2003 | Bridge | G06F 11/1076 |
| | | | | 714/6.12 |
| 10,146,459 | B1 | 12/2018 | Gao et al. | |
| 10,146,624 | B1 | 12/2018 | Gong et al. | |
| 10,318,169 | B2 | 6/2019 | Dalmatov et al. | |
| 2006/0026451 | A1 | 2/2006 | Voigt | |
| 2007/0283091 | A1* | 12/2007 | Nagae | G06F 3/0649 |
| | | | | 711/114 |
| 2010/0199040 | A1* | 8/2010 | Schnapp | G06F 3/0605 |
| | | | | 711/114 |
| 2015/0378613 | A1* | 12/2015 | Koseki | G06F 3/0608 |
| | | | | 711/103 |

(Continued)

FOREIGN PATENT DOCUMENTS

| CN | 101751234 | 6/2010 |
| CN | 101788889 | 7/2010 |

(Continued)

*Primary Examiner* — Masud K Khan
(74) *Attorney, Agent, or Firm* — BainwoodHuang

(57) ABSTRACT

Embodiments of the present disclosure provide a method of managing a disk pool, the disk pool having a plurality of disks which are divided into a plurality of disk extents, the method comprising: determining the number of input/output (I/O) requests for disk extents in the disk pool within a predetermined period of time; determining respective hotness of the disk extents based on the number of I/O requests; determining hotness of the disks based on the hotness of the disk extents; and determining migration of data in the disk extents based on the hotness of the disk.

16 Claims, 6 Drawing Sheets

(56) References Cited

U.S. PATENT DOCUMENTS

| | | | |
|---|---|---|---|
| 2016/0004473 A1 | 1/2016 | Chiu et al. | |
| 2017/0220287 A1* | 8/2017 | Wei | G06F 12/06 |
| 2018/0203614 A1* | 7/2018 | Aronovich | G06F 3/0613 |
| 2019/0220194 A1 | 7/2019 | Liu et al. | |
| 2019/0332502 A1 | 10/2019 | Ma et al. | |

FOREIGN PATENT DOCUMENTS

| | | |
|---|---|---|
| CN | 104937574 | 9/2015 |
| CN | 105138416 | 12/2015 |

* cited by examiner

METHOD AND DEVICE FOR MANAGING DISK POOL

RELATED APPLICATIONS

This application claim priority from Chinese Patent Application Number CN201710250027.X, filed on Apr. 17, 2017 at the State Intellectual Property Office, China, titled "METHOD AND DEVICE FOR MANAGING DISK POOLS" the contents of which is herein incorporated by reference in its entirety.

FIELD

Embodiments of the present disclosure generally relate to storage management, and more specifically, to a method and device for managing a disk pool.

BACKGROUND

A Redundant Array of Independent Disk (RAID) is a hard disk group formed by combining multiple independent disks in different manners. For a user, a disk array RAID is like a hard disk, but it may have a better storage capacity than a single hard disk, and may also provide data backup. When data in disk extents are damaged, data backup may be used to recover the damaged data, thereby protecting security of user data. Different combining manners of disk arrays are called RAID levels, such as RAID 0, RAID 1, RAID 5 or the like.

It is often observed in a traditional disk array that user requests focus on partial data of certain disks in the disk array. If there are too many requests for processing the partial data, a hotspot issue will be caused. Due to limitations of hardware parameters of the single data disk per se, it cannot process excessive data processing requests separately. If the excessive data processing requests focus on a single disk or several disks, the limitation of the parameters of the disk per se will decelerate an access speed of the whole disk array.

With development of the disk array techniques, there are growing applications of mapped disk arrays at present. Different from traditional disk arrays having separately controllable disks, a plurality of mapped disk arrays is mapped to a disk pool, such that the plurality of disk arrays share a common disk pool. This greatly improves a utilization efficiency of the disk. However, since it does not improve the produced hot spot issue, there is also the problem of the reduced access speed of the disk pool caused by the hotspot issue in the mapped disk array.

SUMMARY

The objective of embodiments of the present disclosure is to provide a solution of managing a storage system.

According to one aspect of the present disclosure, there is provided a method of managing a disk pool. The method may be implemented in a device for managing a disk pool. In the method, the disk pool has a plurality of disks which are divided into a plurality of disk extents. The method comprises: determining the number of input/output (I/O) requests for disk extents in the disk pool within a predetermined period of time; determining respective hotness of the disk extents based on the number of I/O requests, the hotness of a disk extent indicating how often the disk extent is accessed within the predetermined period of time; determining hotness of a disks based on the hotness of the disk extents, hotness of one disk indicating how often the disk is accessed within the predetermined period of time; and determining migration of data in the disk extents based on the hotness of the disks.

In some embodiments, determining migration of data in the disk extents based on the hotness of the disks includes: in response to hotness of a first disk exceeding a first threshold hotness, determining a second disk in the disk pool, hotness of the second disk being less than a second threshold hotness; determining a first disk extent in the first disk, hotness of the first disk extent being greater than a third threshold hotness; and migrating data into the first disk extent to a disk extent of the second disk.

In some embodiments, determining migration of data in the disk extents based on the hotness of the disks includes: in response to the number of idle disk extents in a third disk being less than a threshold number, determining a second disk extent in the third disk, hotness of the second disk extent being less than a fourth threshold hotness; selecting a fourth disk from the plurality of disks, such that the fourth disk satisfies at least one of the following: a number of idle disk extents in the fourth disk exceeds the threshold number, or hotness of the fourth disk is less than a fifth threshold hotness; and migrating data in the second disk extent into a disk extent of the fourth disk.

In some embodiments, determining respective hotness of the disk extents comprises: for at least one disk extent of the disk extents, determining the numbers of I/O requests received by the at least one disk extent within a plurality of time intervals of the predetermined period of time; and determining hotness of the at least one disk extent based on the numbers of I/O requests within the plurality of time intervals.

In some embodiments, determining hotness of the at least one disk extent based on the numbers of I/O requests within the plurality of time intervals comprises at least one of the following: determining the hotness of the at least one disk extent based on an average value of the numbers of I/O requests within the plurality of time intervals; or determining the hotness of the at least one disk extent by applying a weighted moving average function to the number of I/O requests within the plurality of time intervals.

In some embodiments, the first threshold hotness is determined based on a number of I/O requests that the disk can process within the predetermined period of time.

In some embodiments, the disk pool corresponds to a plurality of mapped disk arrays, at least one of the mapped disk arrays including a disk extent strip corresponding to disk extents in a plurality of different disks of the disk pool.

In a second aspect of the present disclosure, there is provided a manager for a storage system, the storage system including a disk pool having a plurality of disks which are divided into a plurality of disk extents, the manager comprising: a processor; and a memory having computer program instructions stored thereon which, when executed by the processor, control the storage system to perform acts including: determining the number of input/output (I/O) requests for disk extents in the disk pool within a predetermined period of time; determining respective hotness of the disk extents based on the number of I/O requests, hotness of a disk extent indicating how often the disk extent is accessed within the predetermined period of time; determining hotness of the disks based on the hotness of the disk extents, hotness of a disk indicating how often the disk is accessed within the predetermined period of time; and determining migration of data in the disk extents based on the hotness of the disks.

According to a third aspect of the present disclosure, there is provided a computer program product, the computer program product being tangibly stored on a non-volatile computer readable medium and including machine executable instructions which, when being executed, cause a machine to perform steps of the method according to the first aspect of the present disclosure.

It will be appreciated that, this Summary is not intended to identify key features or essential features of the claimed subject matter, nor is it intended to be used to limit the scope of the claimed subject matter. Other features of the present disclosure will be made apparent by the following description.

DETAILED DESCRIPTION OF EMBODIMENTS

Figure 1:
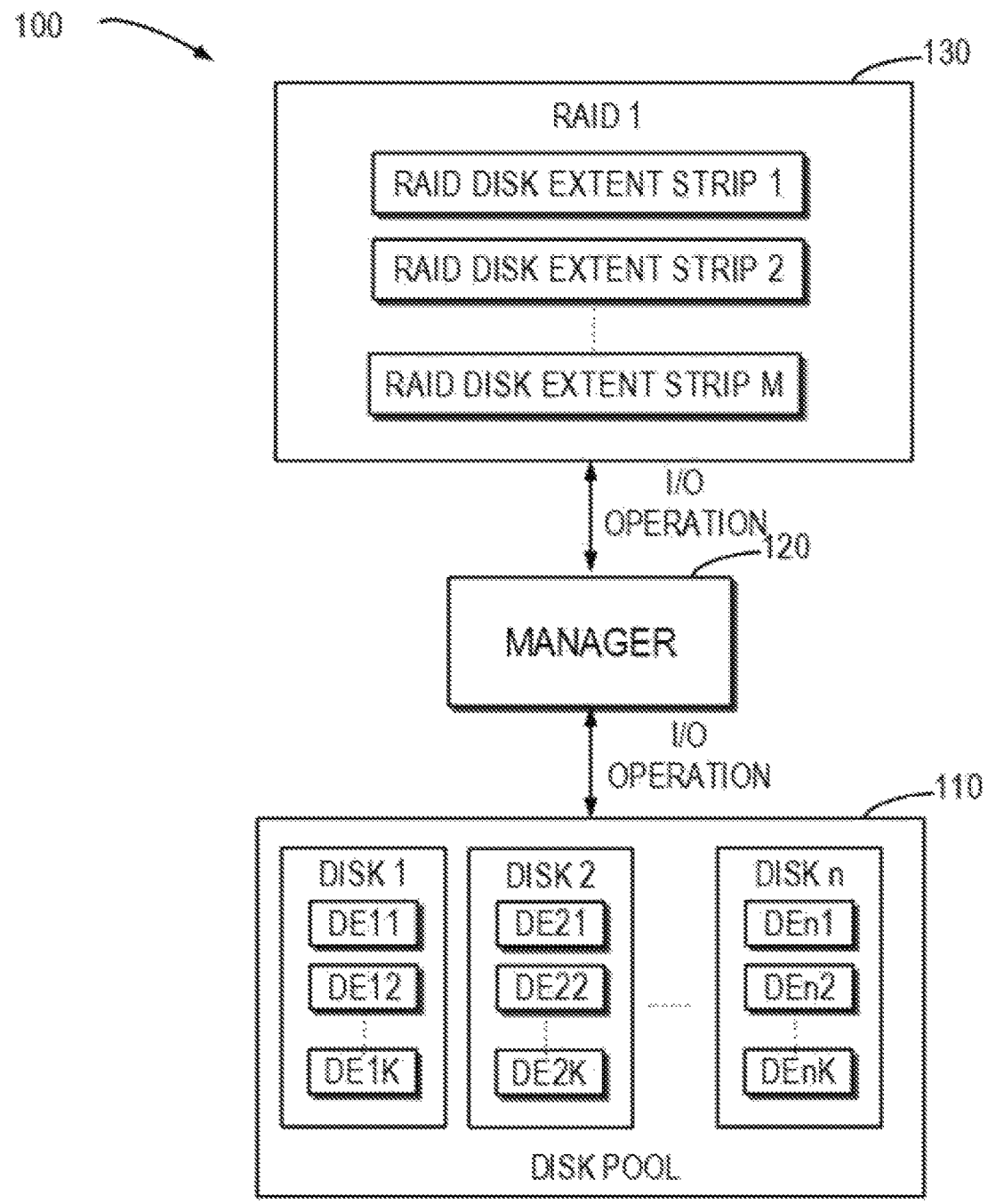
FIG. 1 is a diagram illustrating managing a disk pool in a storage system according to embodiments of the present disclosure.

Embodiments of the present disclosure will now be described in detail with reference to the drawings. Although the drawings illustrate some embodiments of the present disclosure, it should be appreciated that the present disclosure may be implemented in various forms and cannot be interpreted as being limited to the embodiments described herein, and in turn, these embodiments are only provided for enabling more thorough and complete understanding of the present disclosure. It is to be understood that the drawings and embodiments of the present disclosure are merely provided exemplarily and not intended for limiting the protection scope of the present disclosure.

In the description of embodiments of the present disclosure, the term "includes" and its variants are to be understood as open-ended terms that mean "includes, but is not limited to." The term "based on" is to be understood as "based at least in part on." The term "one embodiment" and "the embodiment" are to be understood as "at least one embodiment." The terms "first," "second," and the like may refer to different or same objects. Other definitions, explicit and implicit, may be included below.

Principles of this disclosure will now be described with reference to various example embodiments illustrated in the drawings. Although the drawings illustrate preferred embodiments of the present disclosure, it should be appreciated that description of those embodiments is merely to enable those skilled in the art to better understand and further implement example embodiments of the present disclosure and is not intended to limit the scope disclosed herein in any manner.

FIG. 1 is a diagram illustrating managing a disk pool in a storage system 100 according to embodiments of the present disclosure. As shown therein, the storage system 100 includes a disk pool 110, a manager 120 for managing the disk pool, and a disk array 130 for mapping data to the disk pool 110 by the pool disk manager. The memory system receives data from an external device via an interface and stores the received data, and returns the stored data to the external data. For simplicity, the external device and components connected thereto are not shown.

In the storage system as shown, the disk pool 110 is a storage medium for storing a large amount of data. In the example embodiment, the disk pool may include various volatile and/or non-volatile data storage medium. The example of the storage medium may include, but is not limited to, a disk, an optical disk, a hard disk, a solid state disk (SSD), a cache.

In the storage system as shown, the manager 120 is a processor for managing data storage in the storage system. The processor may include, but is not limited to, a central processing unit (CPU), a controller, a microprocessor, a digital signal processor (DSP) and a multi-core processor.

In the storage system as illustrated, the disk array 130 is a virtual storage device that stores data in different disk extents of a plurality of hard disks. The virtual disk array 130 may be a disk array of different level, and may include, but is not limited to, RAID 0, RAID 1, RADI 0+1, RAID 2, RAID 3, RAID 4, RAID 7, RAID 10, and RAID 53.

FIG. 1 illustrates that the disk pool 110 includes a plurality of disks. In the example, the disk pool 110 includes a plurality of disks. The disk in the disk pool 110 is divided into a plurality of disk extents. More specifically, each disk in the disk pool 110 is divided into an identical number (K) of disk extents, where K is a positive integer, and the disk extents have the same size. The disk array 130 is a virtual disk array for storing data. The virtual disk array mapped to the disk pool 110 may include a plurality of disk arrays. In this example, only a virtual disk array 130 mapped to the disk pool 110 is shown for convenience of description. In other examples, there may be two, three or more disk arrays 130 mapped to the disk pool 110. The disk array 130 in this example may employ a storage mode of RAID 5. If this mode is used for storing data, when a fault occurs to data in one disk extent therein, the data of the faulty disk extent may be obtained through data of other disk extents and a parity check disk extent, so as to ensure security of the data.

The storage space in the disk array is divided into disk array disk extent strips, wherein the disk array disk extent strips are correspond to a plurality of disk extents within the disk pool. Each strip corresponding to 5 disk extents will be taken as an example below. In other examples, a number of the disk extents corresponding to the disk extent strip is not limited to 5 but may be any arbitrary number.

As shown in FIG. 1, the disk array 130 comprises a plurality of strips. In an example, the disk array is provided therein with M strips, the strips 130-1, 130-2, . . . , 130-M, where M is a positive integer greater than 0. In other examples, the number of strips may be any number. In this example, the strips have the same size, each strip corresponds to 5 disk extents, and a size of the corresponding disk extent is identical to that of the disk extent in the disk pool. Each disk extent in each strip is mapped to disk extents on different disks in the disk pool, i.e., the data in the strip are actually stored in disk extents of a plurality of different disks in the disk pool.

As shown in FIG. 1, in a predetermined period of time, upon receipt of commands operating the RAID disk extent strips 1, 2 and M on the disk array 130, e.g. I/O requests, the disk extent of the disk extent strip 1 is mapped to a disk extent 1-1 of the disk 1, a disk extent 2-1 of the disk 2, and disk extents of other different disks in the disk pool 110. The disk extent of the RAID disk extent strip 2 is mapped to a disk extent 1-2 of the disk 1, a disk extent n-1 of the disk n, and disk extents of other different disks in the disk pool 110. The disk extent of the RAID disk extent strip M is mapped to a disk extent 1-K of the disk 1, a disk extent n-2 of the disk n, and disk extents of other different disks in the disk pool 110. Hence, in the predetermined period of time, the disk 1 in the disk pool 110 has three I/O requests, the disk 2 has one I/O request, and the disk n has two I/O requests. Therefore, when the I/O operation is being performed, I/O requests of the three disks are not equal, and the disk 1 has a relatively great number of I/O requests. If a large amount of the operations are being performed, hotness issue will be caused, since each disk has a different number of I/O requests. Due to a restriction of parameters of each disk, the data processing speed of the entire disk pool is limited by the I/O request processing speed of each disk, thus reducing the performance of the entire disk pool.

In order to at least partly solve the foregoing problem and other potential problems, embodiments of the present disclosure provide a solution for managing a disk pool. The method for solving this problem will be described in detail below with reference to the drawings.

In this solution, the storage system is provided therein with the disk pool 110 for storing data, as shown in FIG. 1. The disk pool includes a plurality of disks, and each disk is divided into a plurality of disk extents, such as K disk extents. The disk extents are used to store data. A manager 120 for managing the disk pool is provided, which manages mapping of the disk extents and access to the data within the disk pool.

The manager of the disk pool manages various parameters of each disk extent, including the number of I/O requests of each disk extent, a source address of mapping, a destination address of mapping, etc. The number of I/O requests of each disk extent may be obtained through a corresponding counter, and when the I/O operation is performed for the disk extent, one is added to the number of the counter. The counter may be implemented by hardware, software or firmware.

Figure 2:
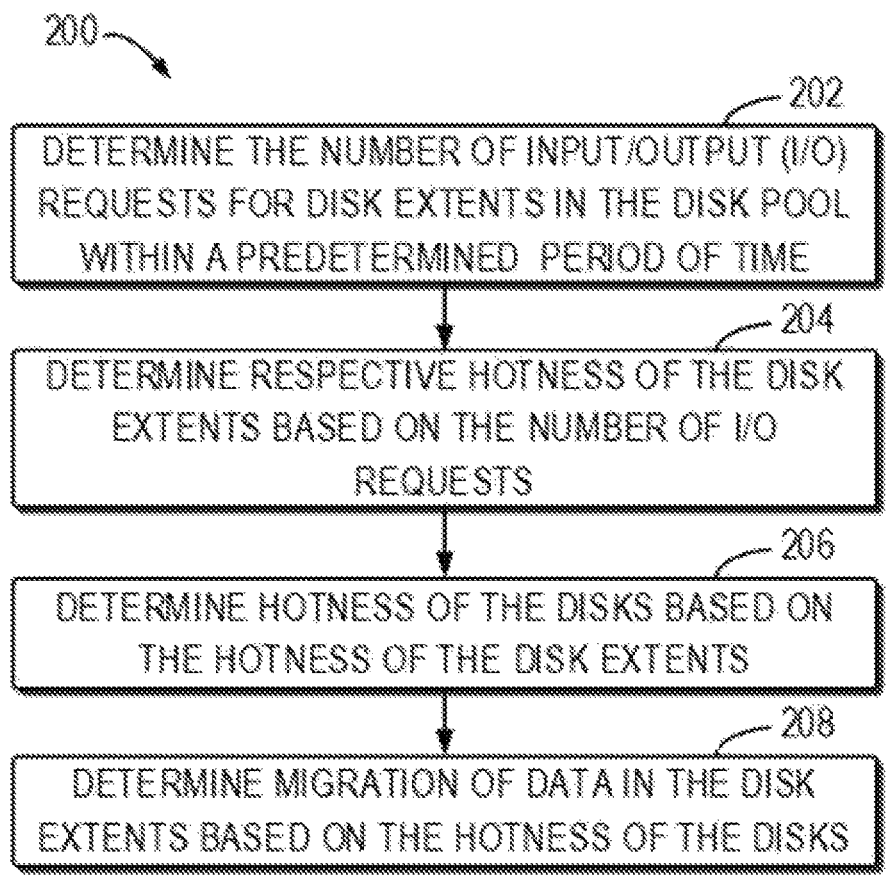
FIG. 2 is a flow chart illustrating managing a disk pool according to one embodiment of the present disclosure.

As shown in FIG. 2, at block 202, a predetermined period of time is set, and the number of the input/output (I/O) requests of each disk extent in the disk pool is counted. The predetermined period of time may be a duration set by those skilled in the art according to needs. In one example, the number of the input/output (I/O) requests at an initial time point of the predetermined period of time is set as 0, it becomes 1 if one input/output (I/O) request is performed for this disk extent, and 1 is further added when a further input/output (I/O) request is performed within the predetermined period of time. The period of time of accessing I/O in the predetermined period of time can be determined by acquiring the number of the input/output (I/O) requests.

Next, the method moves to a block 204. At block 204, respective hotness of the disk extents is determined based on number of the I/O requests on the disk extents. In order to determine a frequency of access to the disk extent, hotness of a disk extent is used herein to indicate a frequency of the disk extent being accessed within the predetermined period of time. At block 202, the number of the I/O requests for the disk extents within the predetermined period of time is counted. Based on the counted number of these I/O requests, hotness of the disk extents may be determined through various methods. The method for determining the hotness of the disk extent based on the number of the I/O requests will be described in detail below with reference to the drawings.

At block 206, hotness of the disks is determined based on the hotness of the disk extents. As described at block 204, hotness of a disk extent indicates how often the disk extent is accessed within the predetermined period of time, and the hotness of a disk is used herein to indicate how often the disk is accessed within the predetermined period of time. Since the hotness of each disk extent in the disk pool has been determined at block 204, the hotness of each disk is much more easily obtained through the hotness of each disk extent. In an example, the hotness of the disk is obtained by summing up the hotness of each disk extent in the disk. In other examples, the hotness may also be obtained in any other manners based on the disk extent.

At block 208, migration of data in the disk extents is determined based on the hotness of the disks. After determining the hotness of the disk at block 206, the hotness of each disk may be obtained based on computed data, and it then can be determined, based on performance parameters of the disk, which disks have exceeded restriction conditions thereof, thereby influencing the I/O performance of the disk pool. In order to avoid the above-mentioned problem, the hotness of the disk which is being frequently accessed can be lowered by migrating the disk extent in the disk with an exceedingly high hotness to a disk with a relatively low hotness, such that the access to the disk can be confined within a threshold of its I/O operation, which ensures the performance of the entire disk pool to be stable and achieves the most ideal effect.

Figure 3:
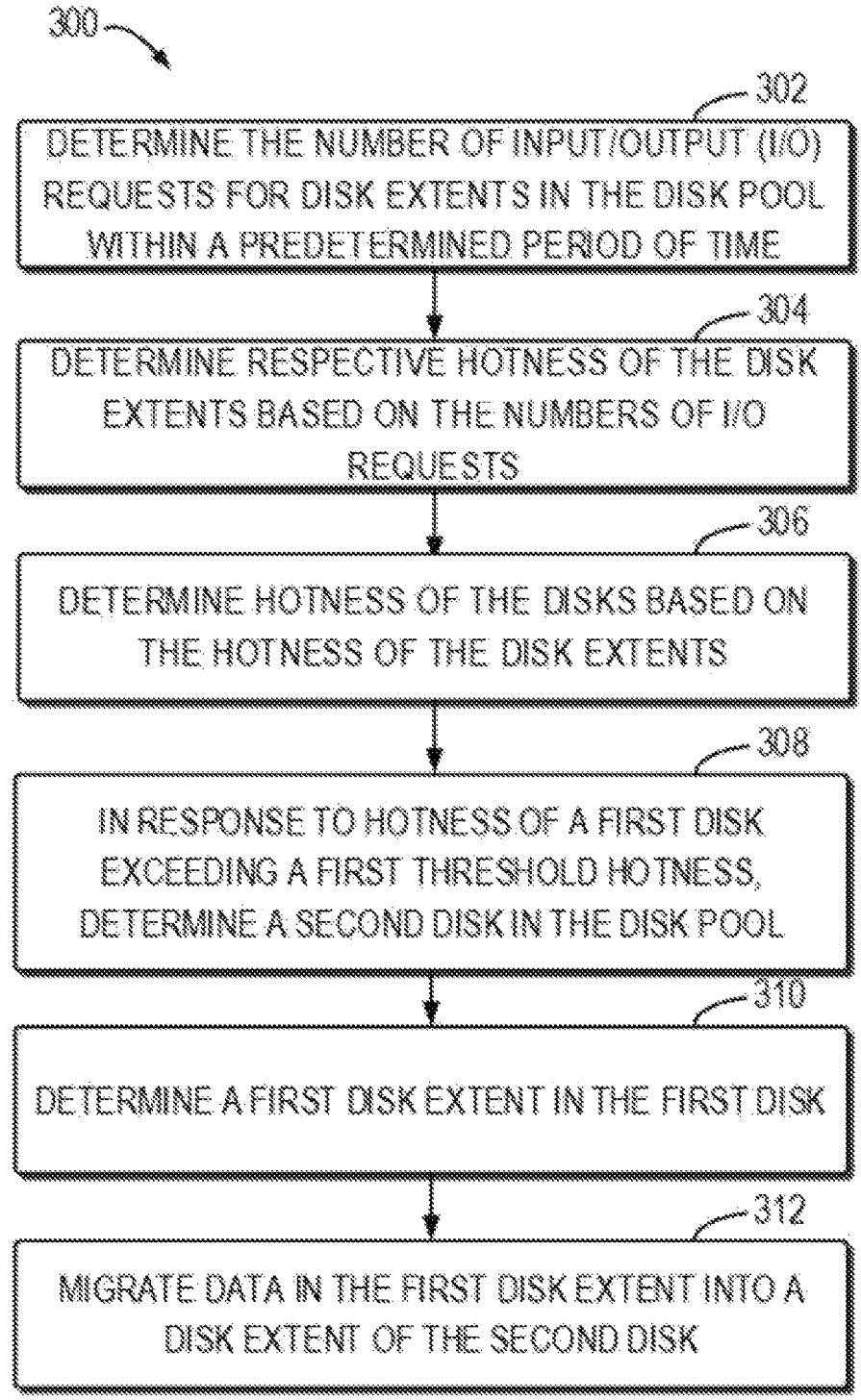
FIG. 3 is a flow chart illustrating managing a disk pool according to another embodiment of the present disclosure.

FIG. 3 illustrates another example of data migration in the disk extent. The contents in blocks 302-306 are identical to those at blocks 202-206 in FIG. 2, and thus the detailed description is omitted herein for the contents have already been depicted in FIG. 2. FIG. 3 mainly depicts blocks 308-312. At blocks 308-312, the hotness of the disk is used to determine migration of data in the disk extent.

In the foregoing contents, the hotness of the disks has been determined based on the number of the I/O requests of the disk extents in the predetermined period of time. In order to determine whether the disk in the disk pool is operated normally and does not affect the performance of the entire disk pool, it needs to determine whether the hotness of each disk in the disk pool exceeds a threshold hotness H1 which is also referred to as first threshold hotness. In one example, the first threshold hotness denotes a maximum value of the disk in the disk pool capable of processing the I/O requests within the predetermined period of time. In another example, the first threshold hotness may also be of other values, and, for example, the first threshold hotness may be set to indicate that the disk in the disk pool can process 80% of the maximum value of the I/O requests within the predetermined period of time. Alternatively or in addition, the first threshold hotness may be of a value set by those skilled in the art according to needs.

By comparing the hotness of each disk in the disk pool with the first threshold hotness, the disk exceeding the threshold hotness may be determined, which is also referred to as first disk. Therefore, at block 308, in response to the hotness of the first disk exceeding the first threshold hotness, a disk in the disk pool of which hotness is lower than another threshold hotness H2 (called as "second threshold hotness") is determined, which is referred to as second disk. For the first disk that is determined to exceed the first threshold hotness, as the disk is frequently accessed such that the disk itself cannot process all access requests thereof in time, this disk may result in deterioration of the entire performance of the disk pool. Since there are many disks in the disk pool, it may occur that the hotness of multiple similar disks, e.g. two, three or more disks, are greater than the respective hotness thresholds thereof.

At block 310, the first disk extent in the first disk is determined. The hotness of the first disk extent is a disk extent having the highest hotness in the disk. After determining the first disk, the hotness of which exceeds the threshold hotness, in order to reduce the hotness of the first disk, it is required to determine the disk extent needing data migration in each disk, and by migrating data in the disk extent to other disk extents, the hotness of the first disk is reduced. When the disk extent needing migration in the first disk is determined, it is determined whether the hotness of the first disk extent is greater than a threshold H3, also called third threshold hotness. After determining the disk having the highest hotness, the first disk extent may be determined based on the hotness of each disk extent in the disk. In one example, the first disk extent is determined based on that the hotness value of the disk extent is the greatest in the disk. If the disk extent of the highest hotness is migrated out, the hotness of the disk may be reduced obviously, thereby enabling the disk to more rapidly conform to the restriction of its parameters.

At block 312, the data in the first disk extent are migrated into the disk extent of the second disk. Since it has been determined that the disk having the highest hotness is determined as the first disk and the disk having the lowest hotness is determined as the second disk, it is easily implemented that the disk extent having the highest hotness in the disk A is migrated to the disk extent of the disk N having the lowest hotness. In one example, the disk extent selected from the disk having the lowest hotness may be an idle disk extent, or may be a disk extent having the lowest hotness in the disk. As such, the access number of each disk in the disk pool may be adjusted well to improve the work efficiency of the disk pool.

After the disk extent migration, though the hot spot issue is avoided, the number of idle disk extents on each disk is balanced in order to further improve the I/O performance of the disk pool, and the present disclosure further performs re-balance processing on the disk pool after disk extent migration, such that each disk runs in a more balanced manner. The disk extent re-balancing process performed for each disk in the disk pool will be introduced below with reference to FIG. 4.

During the re-balancing process, the number of idle disk extents of each disk within the disk pool is first determined. The number of the idle disk extents may be determined by counting with a counter, or may be implemented by retrieving the idle disk extents. At the block 414, in response to the number of the idle disk extents of a disk in the disk pool being less than a threshold number, a source disk, also referred to as a third disk, is determined. Then, a disk extent in the third disk which has hotness lower than another threshold hotness H4 (also referred to as fourth threshold hotness) is determined, which is also referred to as a second disk extent. In the present embodiment, the selected third disk may be a disk having the fewest idle disk extents, which indicates that this disk has relatively fewer idle extents and most disk extents in the disk are disk extents being accessed. Therefore, the disk extent in this disk may be selected as a source disk extent for migration adjustment. Subsequent to selecting the third disk, the disk extent in the disk which has hotness lower than a fourth threshold hotness is selected as a second disk extent.

At block 416, a fourth disk is selected from the disk pool. The fourth disk may be selected based on various conditions. In one example, the fourth disk may be a disk in which the number of the idle disk extents in the disk exceeds the threshold number. At this time, the fourth disk may be a disk having the most idle disk extents, which indicates that the hotness of each disk extent of the disk is not uniform, and due to the presence of relatively more idle disks, migration of data can be satisfied. In another example, the fourth disk may be a disk having hotness lower than a certain threshold which may be set by those skilled in the art according to needs, e.g. a disk having the lowest hotness, which indicates that an utilization efficiency of the disk is low, and selecting the disk may greatly improve the utilization efficiency of the disk, further changing the overall efficiency of the disk pool. In another example, both the number of the idle disk extents in the disk and the hotness of the disk may be taken into consideration. For example, those skilled in the art may select a plurality of disks based on that the number of idle disk extents in a disk is greater than a predetermined value. Then the hotness of the selected disk is determined, and finally the disk having the lowest hotness is taken as the fourth disk. The above only is an example, and the selection of the fourth disk is not limited to the above example in the present invention. The fourth disk may be various disks satisfying conditions.

At block 418, the data in the second disk extent are migrated into the disk extent of the fourth disk. After determining the second disk extent and the fourth disk, the second disk extent acts as a source disk extent, the idle disk extents of the fourth disk act as target disk extents, and the data in the second disk extent are migrated to the idle extents in the fourth disk. Therefore, re-balance of each disk in the disk array is accomplished.

The block 204 in FIG. 2 discloses that the respective hotness of the disk extents is determined based on I/O. In one example, determining the respective hotness of the disk extents based on the number of I/O requests may be implemented in the following manner: for at least one disk extent in the disk extent, determining the number of I/O requests which the at least one disk extent receives within a plurality of time intervals in the predetermined period of time; and determining hotness of the at least one disk extent based on the number of I/O requests within the plurality of time intervals. In other examples, the respective hotness of the disk extents may be determined in other appropriate methods.

In one example, the predetermined period of time includes a plurality of time intervals is set and the number of I/O requests of the disk extent in each time interval is counted by the manager. For example, a continuous period of time is divided into n time intervals, and the number of I/O requests in each time interval is a1, a2, a3 . . . an. Therefore, the hotness of the disk extent is as follows: $H=(a1+a2+a3+ \ldots +an)/n$. It is easily implemented to obtain the hotness of the disk extent by averaging the number of the I/O requests within each time interval in the predetermined period of time.

The operation of obtaining the hotness of the disk extent by averaging the number of the I/O request within each time interval is simple and convenient, but sometimes cannot reflect accurately the current condition of each disk extent. In order to combine with the actual condition of the existing disk extent, in another example, different periods of time are provided with different weight values w, and the hotness of the disk extent is $H=a1*w1+a2*w2+ \ldots +an*wn$. The weight coefficient thereof is determined based on a distance from the time interval to the current time. Hence, for example, if the time interval is 3, the nearest time interval coefficient may be set as $\frac{1}{2}$, the coefficients for both time intervals prior to it are $\frac{1}{4}$, and the hotness of the disk extent is $H=a1*\frac{1}{2}+a2*\frac{1}{4}+an*\frac{1}{4}$.

In another example, the hotness of the disk extent may be determined using a mathematical equation. In one example, the hotness of the at least one disk extent is determined by applying a weighted moving average function to the number of the I/O requests within the plurality of time intervals. The weighted moving average function is as follows:

$$T=T'*e^{-a*\Delta t}+\Delta H*(1-e^{-a*\Delta t})/(a*\Delta t) \quad (1)$$

Wherein, T denotes the hotness of the disk extent within the current time interval, T' denotes hotness in the disk extent within the preceding time interval, a denotes an attenuation coefficient, $\Delta t$ denotes a time interval, $\Delta H$ denotes the number of I/O requests of the disk extent between the current sampling time and the preceding sampling time, i.e., the number of I/O requests of a disk extent within a time interval.

Figure 4:
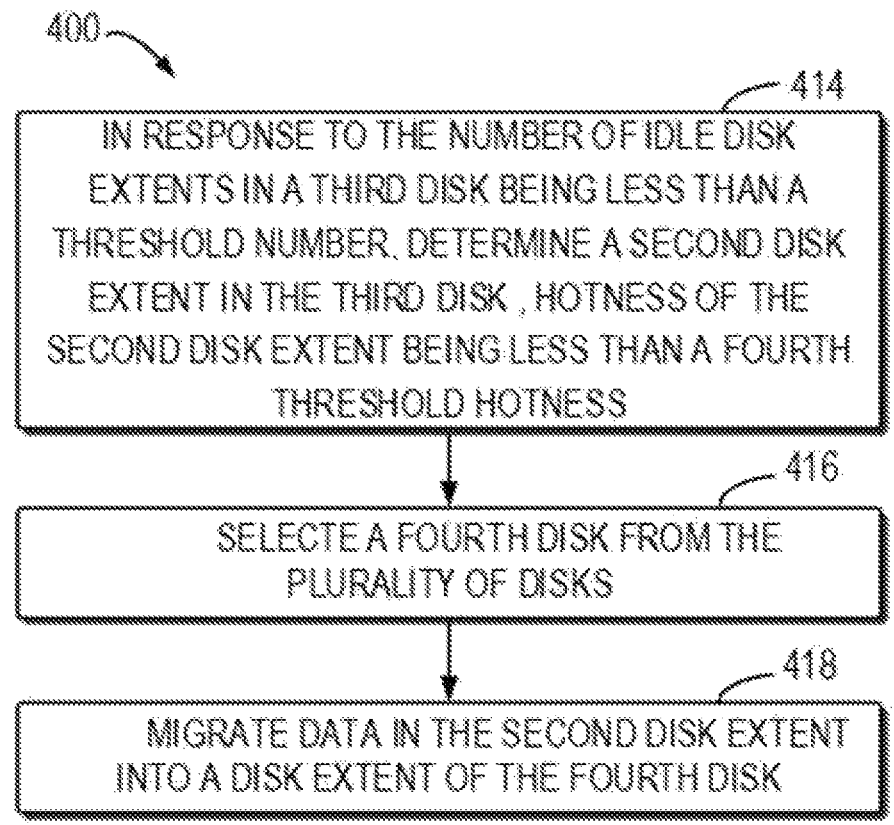
FIG. 4 is a flow chart illustrating managing a disk pool according to another embodiment of the present disclosure.
Figure 5:
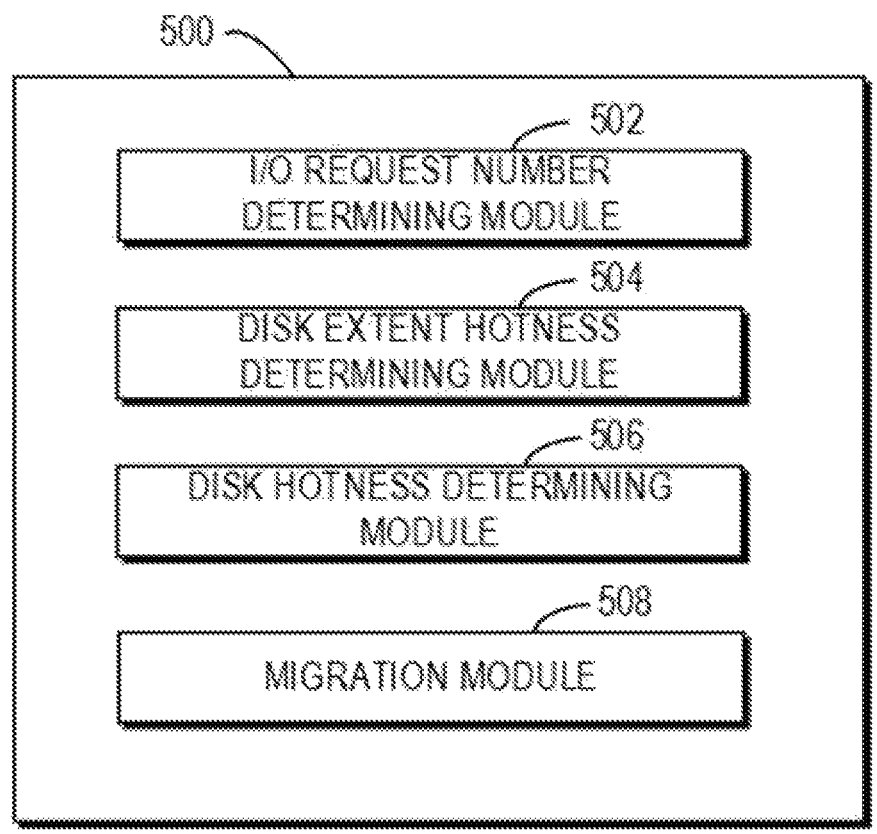
FIG. 5 is a block diagram illustrating an apparatus according to one embodiment of the present disclosure.

FIG. 5 is a block diagram illustrating a management apparatus 500 for managing a disk pool in the storage system according to embodiments of the present disclosure. The blocks 202-208 as shown in FIG. 2, the blocks 302-314 as shown in FIG. 3, and the blocks 414-418 as shown in FIG. 4 may be executed by the device 500. The management device 500 comprises an I/O request number determining module 502, a disk extent hotness determining module 504, a disk hotness determining module 506, and a migration module 508. The management device is used to manage the disk pool in the storage system, wherein the disk pool includes a plurality of disks and the plurality disks are divided into a plurality of disk extents.

The I/O request number determining module 502 is configured to determine the number of input/out (I/O) requests for the disk extents in the disk pool within a predetermined period of time; the disk extent hotness determining module 504 is configured to determine respective hotness of the disk extents based on the number of I/O requests, the hotness of one disk extent indicating a frequency of the disk extent being accessed in the predetermined period of time; the disk hotness determining module 506 is configured to determine the hotness of the disk based on the hotness of the disk extent, the hotness of a disk indicating a frequency of the disk being accessed in the predetermined period of time; and the migration module 508 is configured to determine migration of data in the disk extent based on the hotness of the disk.

According to embodiments of the present disclosure, the migration module 508 includes: a first determining module configured to determine a second disk in the disk pool when the manager responds to hotness of a first disk exceeding a first threshold hotness, hotness of the second disk being less than a second threshold hotness; a second determining module configured to determine a first disk extent in the first disk, the hotness of the first disk extent being greater than a third threshold hotness; and a first migration module configured to migrate data in the first disk extent to a disk extent of the second disk.

According to embodiments of the present disclosure, the migration module 508 comprises: a third determining module configured to determine a second disk extent in a third disk when the manager is used to respond to a number of idle disk extents in the third disk being less than a threshold number, the hotness of the second disk extent being less than a fourth threshold hotness; a selection module configured to select a fourth disk from the plurality of disks, such that the fourth disk satisfies at least one of the following: a number of idle disk extents in the fourth disk exceeding the threshold number, or hotness of the fourth disk being less than a fifth threshold hotness; and a second migration module configured to migrate data in the second disk extent to the disk extent of the fourth disk.

According to embodiments of the present disclosure, the disk extent hotness determining module 504 includes: a fourth determining module configured to, for at least one disk extent of the disk extents, determine the number of I/O requests received by the at least one disk extent within a plurality of time intervals in the predetermined period of time; a fifth determining module is configured to determine hotness of the at least one disk extent based on the number of I/O requests within the plurality of time intervals.

Accordingly to embodiments of the present disclosure, the disk extent hotness determining module 504 is configured as: wherein determining hotness of the at least one disk extent based on the number of I/O requests within the plurality of time intervals comprising at least one of the following: determining hotness of the at least one disk extent based on an average value of number of I/O requests within the plurality of time intervals; or determining hotness of the at least one disk extent using a weighted moving average function.

According to embodiments of the present disclosure, the first threshold hotness is determined based on a number of I/O requests that the disk can process within the predetermined period of time.

According to embodiments of the present disclosure, the disk pool corresponds to a plurality of mapped disk arrays, and at least one of the mapped disk arrays includes disk extent strips corresponding to disk extents on several different disks in the disk pool.

Figure 6:
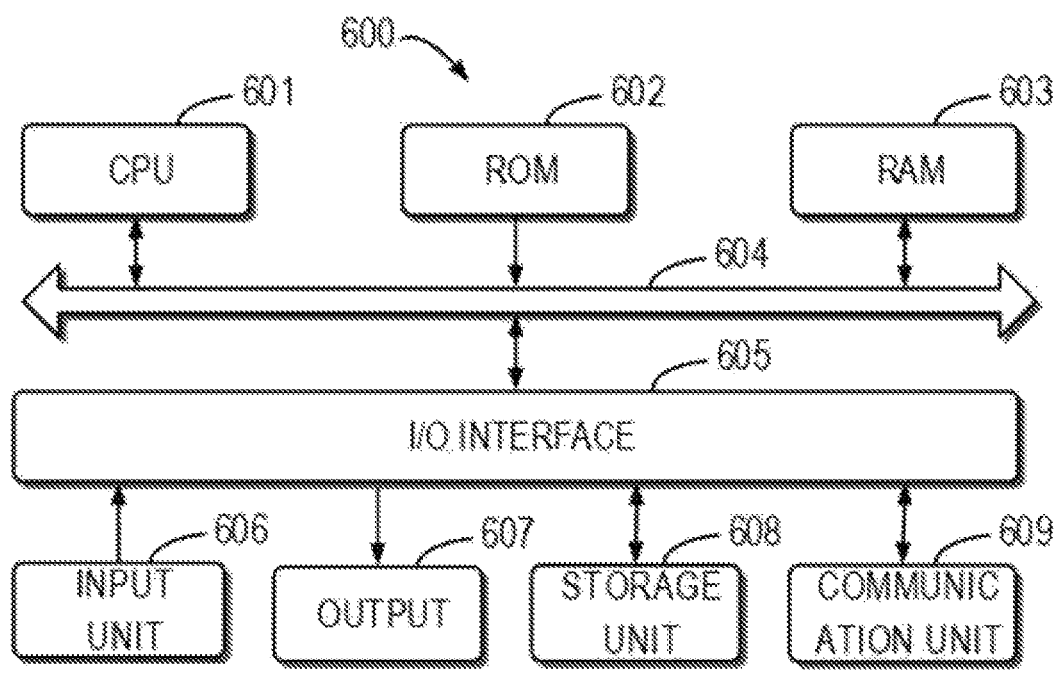
FIG. 6 is a schematic block diagram illustrating a device for implementing embodiments of the present disclosure.

FIG. 6 is a block diagram illustrating a device 600 for implementing embodiments of the present disclosure. For example, the manager 130 for the storage system may be implemented in the device 600. As shown in FIG. 6, the device 600 comprises a central processing unit (CPU) 601 that may perform various appropriate actions and processing based on computer program instructions stored in a read-only memory (ROM) 602 or computer program instructions loaded from a storage unit 608 to a random access memory (RAM) 603. In the RAM 603, there further store various programs and data needed for operations of the device 600. The CPU 601, ROM 602 and RAM 603 are connected to each other via a bus 604. An input/output (I/O) interface 605 is also connected to the bus 604.

The following components in the device 600 are connected to the I/O interface 605: an input 606, such as a keyboard, a mouse and the like; an output unit 607, for example various kinds of displays and a loudspeaker, etc.; a storage unit 608, for example a magnetic disk, an optical disk, and etc.; a communication unit 609, for example a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the method 200, 300 or 400, may be executed by the processing unit 601. For example, in some embodiments, the method 200, 300 and/or 400 may be implemented as a computer software program that is tangibly embodied on a machine readable medium, e.g. the storage unit 608. In some embodiments, part or all of the computer programs may be loaded and/or mounted onto the device 600 via ROM 602 and/or communication unit 609. When the computer program is loaded to the RAM 603 and executed by the CPU

601, one or more steps of the method 200, 300 and/or 400 as described above may be executed.

In conclusion, each embodiment of the present disclosure provides a method and a manager for managing a disk pool in a storage system. The method and the manager can adjust the disk extents in a more effective manner to balance hotness of each disk. Hence, the hot spot issue within the disk may be reduced remarkably, and the performance of the disk pool is improved accordingly.

Generally speaking, various embodiments of the present disclosure may be implemented in software, hardware, logic or a combination thereof. Some aspects may be implemented in hardware, while some other aspects may be implemented in firmware or software, and the firmware or software may be implemented by a controller, a microprocessor or other computing devices. Though various aspects of the present disclosure are shown and depicted in block diagrams, flow charts or some other diagrams, it should be appreciated that the blocks, device, system, technique or method as described herein may be implemented non-restrictively in hardware, software, firmware, dedicated circuits or logic, general hardware or a controller or other computing devices or some combinations thereof.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the present disclosure has been described with specific structural features and/or method acts, it is to be understood that the scope of the technical solution defined in the appended claims is not necessarily limited to the above specific features or acts. In other words, the foregoing description is only optional embodiments of the present disclosure. For those skilled in the art, embodiments of the present disclosure may allow various modifications and changes. Any amendment, equivalent replacement, improvement, etc. in the spirit and principles of the present disclosure is included in the protection scope thereof.

We claim:

1. A method of managing a disk pool, the disk pool having a plurality of disks which are divided into a plurality of disk extents, comprising:
   determining the number of input/output (I/O) requests for disk extents in the disk pool within a predetermined period of time;
   determining respective hotness of the disk extents based on the number of I/O requests, hotness of a disk extent indicating how often the disk extent is accessed within the predetermined period of time;
   determining hotness of the disks based on the hotness of the disk extents, hotness of a disk indicating how often the disk is accessed within the predetermined period of time, wherein hotness of a disk is obtained by summing the hotness of each disk extent in the disk; and
   determining migration of data in the disk extents based on the hotness of the disks, including:
      in response to hotness of a first disk exceeding a first threshold hotness, determining a second disk in the disk pool, hotness of the second disk being less than a second threshold hotness;
      determining a first disk extent in the first disk, hotness of the first disk extent being greater than a third threshold hotness; and
      migrating data in the first disk extent into a disk extent of the second disk;
      in response to the number of idle disk extents in a third disk being less than a threshold number, determining a second disk extent in the third disk, hotness of the second disk extent being less than a fourth threshold hotness;
      selecting a fourth disk from the plurality of disks such that the fourth disk satisfies both of the following:
         the number of idle disk extents in the fourth disk exceeds the threshold number, and
         hotness of the fourth disk is less than a fifth threshold hotness; and
      migrating data in the second disk extent into a disk extent of the fourth disk.

2. The method according to claim 1, wherein determining respective hotness of the disk extents comprises:
   for at least one of the disk extents, determining the numbers of I/O requests received by the at least one disk extent within a plurality of time intervals of the predetermined period of time; and
   determining hotness of the at least one disk extent based on the numbers of I/O requests within the plurality of time intervals.

3. The method according to claim 2, wherein determining hotness of the at least one disk extent based on the numbers of I/O requests within the plurality of time intervals comprises at least one of the following:
   determining the hotness of the at least one disk extent based on an average value of the numbers of I/O requests within the plurality of time intervals; or
   determining the hotness of the at least one disk extent by applying a weighted moving average function to the numbers of I/O requests within the plurality of time intervals.

4. The method according to claim 1, wherein the first threshold hotness is determined based on the number of I/O requests that the disk can process within the predetermined period of time.

5. The method according to claim 1, wherein the disk pool corresponds to a plurality of mapped disk arrays, at least one of the mapped disk arrays including a disk extent strip corresponding to disk extents in a plurality of different disks of the disk pool.

6. The method according to claim 1 wherein determining migration of data in the disk extents based on the hotness of the disks includes rebalancing the hotness of the disks.

7. The method according to claim 1, wherein the first, second, and third thresholds are predetermined.

8. A manager for a storage system, the storage system including a disk pool having a plurality of disks which are divided into a plurality of disk extents, the manager comprising:
   a processor; and
   a memory having computer program instructions stored thereon which, when executed by the processor, control the storage system to perform acts including:

determining the number of input/output (I/O) requests for disk extents in the disk pool within a predetermined period of time;

determining respective hotness of the disk extents based on the number of I/O requests, hotness of a disk extent indicating how often the disk extent is accessed within the predetermined period of time;

determining hotness of the disks based on the hotness of the disk extents, hotness of a disk indicating how often the disk is accessed within the predetermined period of time, wherein hotness of a disk is obtained by summing the hotness of each disk extent in the disk; and determining migration of data in the disk extents based on the hotness of the disks, including:

in response to hotness of a first disk exceeding a first threshold hotness, determining a second disk in the disk pool, hotness of the second disk being less than a second threshold hotness;

determining a first disk extent in the first disk, hotness of the first disk extent being greater than a third threshold hotness; and migrating data in the first disk extent into a disk extent of the second disk;

in response to the number of idle disk extents in a third disk being less than a threshold number, determining a second disk extent in the third disk, hotness of the second disk extent being less than a fourth threshold hotness;

selecting a fourth disk from the plurality of disks such that the fourth disk satisfies both of the following:

the number of idle disk extents in the fourth disk exceeds the threshold number, and hotness of the fourth disk is less than a fifth threshold hotness; and migrating data in the second disk extent into a disk extent of the fourth disk.

9. The manager according to claim 8, wherein determining respective hotness of the disk extents comprises:

for at least one of the disk extents, determining the numbers of I/O requests received by the at least one disk extent within a plurality of time intervals of the predetermined period of time; and determining hotness of the at least one disk extent based on the numbers of I/O requests within the plurality of time intervals.

10. The manager according to claim 9, wherein determining hotness of the at least one disk extent based on the numbers of I/O requests within the plurality of time intervals comprises at least one of the following:

determining the hotness of the at least one disk extent based on an average value of the numbers of I/O requests within the plurality of time intervals; or determining the hotness of the at least one disk extent by applying a weighted moving average function to the numbers of I/O requests within the plurality of time intervals.

11. The manager according to claim 8, wherein the first threshold hotness is determined based on the number of I/O requests that the disk can process within the predetermined period of time.

12. The manager according to claim 8, wherein the disk pool corresponds to a plurality of mapped disk arrays, at least one of the mapped disk arrays including a disk extent strip corresponding to disk extents in a plurality of different disks of the disk pool.

13. A computer program product for managing a disk pool, the disk pool having a plurality of disks which are divided into a plurality of disk extents, the computer program product comprising a non-transitory computer readable medium encoded with computer-executable code, the code configured to enable the execution of:

determining the number of input/output (I/O) requests for disk extents in the disk pool within a predetermined period of time;

determining respective hotness of the disk extents based on the number of I/O requests, hotness of a disk extent indicating how often the disk extent is accessed within the predetermined period of time;

determining hotness of the disks based on the hotness of the disk extents, hotness of a disk indicating how often the disk is accessed within the predetermined period of time, wherein hotness of a disk is obtained by summing the hotness of each disk extent in the disk; and determining migration of data in the disk extents based on the hotness of the disks, including:

in response to hotness of a first disk exceeding a first threshold hotness, determining a second disk in the disk pool, hotness of the second disk being less than a second threshold hotness;

determining a first disk extent in the first disk, hotness of the first disk extent being greater than a third threshold hotness; and migrating data in the first disk extent into a disk extent of the second disk;

in response to the number of idle disk extents in a third disk being less than a threshold number, determining a second disk extent in the third disk, hotness of the second disk extent being less than a fourth threshold hotness;

selecting a fourth disk from the plurality of disks such that the fourth disk satisfies both of the following:

the number of idle disk extents in the fourth disk exceeds the threshold number, and hotness of the fourth disk is less than a fifth threshold hotness; and migrating data in the second disk extent into a disk extent of the fourth disk.

14. The computer program product of claim 13, wherein determining respective hotness of the disk extents comprises:

for at least one of the disk extents, determining the numbers of I/O requests received by the at least one disk extent within a plurality of time intervals of the predetermined period of time; and determining hotness of the at least one disk extent based on the numbers of I/O requests within the plurality of time intervals.

15. The computer program product of claim 14, wherein determining hotness of the at least one disk extent based on the numbers of I/O requests within the plurality of time intervals comprises at least one of the following:

determining the hotness of the at least one disk extent based on an average value of the numbers of I/O requests within the plurality of time intervals; or determining the hotness of the at least one disk extent by applying a weighted moving average function to the numbers of I/O requests within the plurality of time intervals.

16. The computer program product of claim 13, wherein the first threshold hotness is determined based on the number of I/O requests that the disk can process within the predetermined period of time.

\* \* \* \* \*